United States Patent [19]
Held et al.

[11] 3,911,391
[45] Oct. 7, 1975

[54] APPARATUS FOR ACTUATING VEHICLE SAFETY DEVICES

[75] Inventors: Manfred Held, Kuhbach; Johann Spies, Pfaffenhofen, Ulm; Franz Rudolf Thomanek, Schrobenhausen, all of Germany

[73] Assignee: Messerschmitt-Bolkow-Blohm G.m.b.H., Germany

[22] Filed: Feb. 28, 1973

[21] Appl. No.: 336,791

[30] Foreign Application Priority Data
May 5, 1972 Germany............................ 2222038

[52] U.S. Cl......... 340/52 H; 180/103; 280/150 AB; 340/262
[51] Int. Cl.$^2$........................................ B60R 21/08
[58] Field of Search............... 340/52 R, 52 H, 262; 307/10 R; 280/150 B, 150 AB; 180/91, 103, 105 E; 303/21 BE

[56] References Cited
UNITED STATES PATENTS

| | | | |
|---|---|---|---|
| 3,455,148 | 7/1969 | Foster et al........................ | 340/262 |
| 3,629,816 | 12/1971 | Gillund............................. | 340/52 H |
| 3,701,903 | 10/1972 | Merhar............................. | 340/52 H |

Primary Examiner—John W. Caldwell
Assistant Examiner—Joseph E. Nowicki
Attorney, Agent, or Firm—Toren, McGeady and Stanger

[57] ABSTRACT

A sensor mounted in the vehicle produces a signal corresponding to the acceleration of the vehicle. A limiter coupled to the sensor reduces the signal by a value corresponding to the acceleration which can safely be absorbed by passengers in the vehicle. An integrator coupled to the limiter integrates the output of the limiter. A threshold device responsive to the output of the integrator produces an indication when the output of the integrator exceeds a given level so as to actuate a safety device such as an air bag.

7 Claims, 8 Drawing Figures

APPARATUS FOR ACTUATING VEHICLE SAFETY DEVICES

BACKGROUND OF THE INVENTION

This invention relates to vehicle safety devices, and particularly to acceleration-sensitive apparatuses for releasing safety devices that serve to protect passengers of a vehicle during an accident.

In the future, as the number of motor vehicles increases, safety devices which may be called passive and which are automatically actuated during accidents without the help of the passengers, will become more and more important in order to reduce the increasing number of severe accidents resulting in death or injuries to the passengers. One such safety device utilizes a so-called air bag system. Here an air cushion is automatically inflated when the car or other vehicle strikes an obstacle. As the passengers are thrown forward, they are pressed into this air cushion. The cushion absorbs the force of the passengers— bodies before the bodies of the passengers, and particularly their heads, attain excessive speeds relative to the colliding vehicle or cover excessive distances and before they strike against hard parts of the car such as the steering wheel or windshield.

Various means have been suggested for determining the actuating times of such passive safety devices. According to one such suggestion, the car carries one or more sensors each of which is composed of a housing that contains a mass movably mounted in the housing. When the car strikes an obstacle the mass is accelerated over a predetermined path and closes contact which produce an electrical signal to release the safety device. Such a device is described in German published Pat. No. 1,942,211.

Such actuating mechanisms have disadvantages. They contain mechanical switches and springs or spring tongues which cannot be set precisely to release data related to the required acceleration or deceleration of the car. Such switches and springs can exhibit signs of aging which may be caused, for example, by reduction of spring forces, by constant vibration of the car during operation, or by oxidation of the electrical contacts. Moreover, the operability of such releases can only be checked with complicated mechanical and electrical measuring means. The latter require mechanical intervention in the actuating system for the aforementioned aging signs to be recognized in time, so that they can be eliminated by replacement with new parts.

An object of this invention is to improve motor vehicle safety devices.

Another object of the invention is to improve actuating mechanisms of this type.

Another object of this invention is to provide a release or actuating mechanism of this type with mechanically moving parts which can be set precisely to furnish the required release or actuating data.

Another object of the invention is to furnish an actuating apparatus wherein aging signs cannot appear during the normal working life of the car, but which is nevertheless capable of being checked at any time in a simple manner.

SUMMARY OF THE INVENTION

According to a feature of the invention these objects are achieved in whole or in part, by reducing the signal that a sensor produces in response to the acceleration of the car by an amount corresponding to the acceleration that can be absorbed by the passengers, and then integrating the resulting signal until it reaches a threshold value at which point an output actuating indication is produced.

According to another feature of the invention the sensor is a piezoelectric acceleration detector having a series connected output amplifier.

According to another feature of the invention the entire actuator is composed of electrical and electronic parts.

The invention provides a release or actuator which is practically insensitive to vibrations or shocks during the operation of the car, because it has no mechanically moving parts. The term "mechanical" as used herein is used in terms of the ordinary mechanical devices and excludes piezoelectric devices. By using only electrical and electronic parts, the actuating output or data can be set very precisely. Aging signs are not likely because presently available parts have a long life expectancy. Besides, the actuator according to the invention can be checked by simple test circuits, even during the operation of the car, without any mechanical intervention.

According to another feature of the invention, the safety device, which for example may be an air bag, is actuated or released only when the acceleration or deceleration of the car continues for at least a predetermined time. This time occurs only after the output of the integrator that integrates the diminished sensor signal exceeds the threshold value. The latter is set by a threshold value circuit cascade connected to the integrator. Actuation of the air bag or other safety device at the thus determined fictional speed is justified because it is correlated to an impulse value which is exerted on the passengers of the car by the acceleration or deceleration.

This fictional speed depends upon a determination that an object, such as the head of a vehicle passenger, must not attain an excessive speed relative to the speed of the car, without being caught or supported by the safety device. Since the accelerations acting on the car are practically constant, the fictional speed thus determined extends linearly with time. The slope of the speed curve depends upon the magnitude of the acceleration or deceleration. When the car is decelerated at a high rate of deceleration, the safety device is actuated at the predetermined fictional or critical speed, or sooner. Thus for all possible accelerations or decelerations occurring during an accident the safety device can be released in time.

Each passenger of the car can absorb certain forces, such as vibrations which appear during the operation of the car, by virtue of his own support. Such forces do not result in accelerating the passenger's body relative to the car. The invention utilizes this capability, according to another feature, by allowing the output signal supplied by the sensor to be integrated only above a certain value corresponding to the acceleration that can be safely absorbed by passengers in the car.

In addition to these minor vibrations which act on the car, high but brief accelerations may occur which have no harmful effect on the passengers despite their size, because of their short duration. For example, such accelerations occur when a vehicle is driven over a curbstone at high speed. Because of the short duration of the acceleration, the output signal of the integrator does not exceed the threshold value following the threshold value circuit. Thus, in this case the safety device is not actuated.

Because of the invention, high amplitude accelerations which are sensed, but which are caused by direct mechanical shocks or blows on the sensor, or by electrical interference pulses, are ignored by the apparatus, so that actuation of the safety device in response to such shock or pulses is avoided.

In contrast to known mechanical releases, apparatuses according to the invention can be set to furnish more precise and highly differentiated actuating indications.

According to another feature of the invention, a second threshold value circuit responds to the sensor and the outputs of the respective threshold value circuits pass through an AND circuit. The output of the AND circuit is then applied to the safety device.

The safety device is thus actuated only when the calculated critical speed appears within the acceleration interval. The apparatus avoids releasing or actuating the safety device in response to brief acceleration shocks which can be absorbed by the passengers.

According to another feature of the invention the actuating indication of the actuator is set to correspond to a fictional distance covered by an inert mass, similar to presently known releases. This is accomplished by an additional integrator with a predetermined integrand threshold coupled between the integrator and the cascaded threshold value circuit, so that the output of the acceleration sensor is integrated twice.

These and other features of the invention are pointed out in the claims. Other objects and advantages of the invention will become known from the following detailed description when read in light of the accompanying drawings.

DETAILED DESCRIPTION OF PREFERRED EMBODIMENTS

Figure 1:
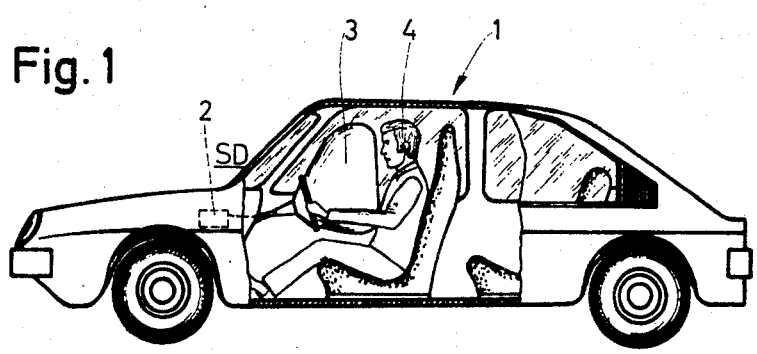
FIG. 1 is a partly cut away elevation of an automobile which includes a safety system embodying features of the invention in which an actuating apparatus actuates a safety device.

In FIG. 1, an automobile 1 carries an actuator 2 which produces a signal that results in rapid inflation of one or more air cushions 3 when the automobile is decelerated beyond a given value during an accident. When passengers 4 seated in the car are thrown forward during the deceleration they are pressed against the air cushion 3 so their bodies cannot strike hard portions of the automobile 1. The air cushions 3 form part of a savety device generally designated SD, which together with the actuator 2 forms a safety system.

The actuator 2 is variously referred to as an actuating apparatus, a release and a releasing apparatus. For the sake of clarity, like reference characters are used for like parts throughout the drawings.

Figure 2:
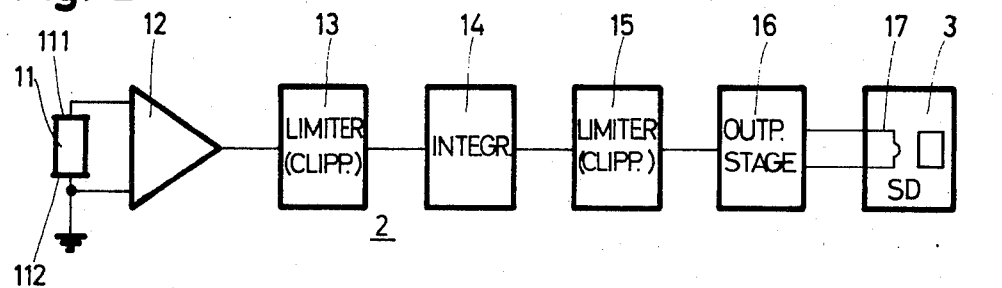
FIG. 2 is a block diagram of an actuating apparatus embodying features of the invention and used in the automobile of FIG. 1.

In the release 2 shown in FIG. 2, a piezoelectric ceramic body of a sensor 11 is fixed between two electrodes 111 and 112. One of the electrodes, e.g. 111, is rigidly fixed with the automobile in the driving direction, whereas the other electrode 112 is coupled with a free or springloaded mass (not shown) which, when the automobile is decelerated or accelerated, presses or stretches the piezoelectric ceramic body 11, so that charges will appear on electrodes 111 and 112. The electrical signals resulting at the electrodes 111 and 112 from distortion of the piezoelectric body are amplified in an amplifier 12. The output signal of the amplifier is substantially proportional to the acceleration or deceleration of the vehicle 1. In order to prevent equalization of the charges on the electrode, the time constant of the entire sensor 11 is selected to be substantially greater than the mean response time for actuation of the air bags 3 in the safety device SD.

Figure 5A:
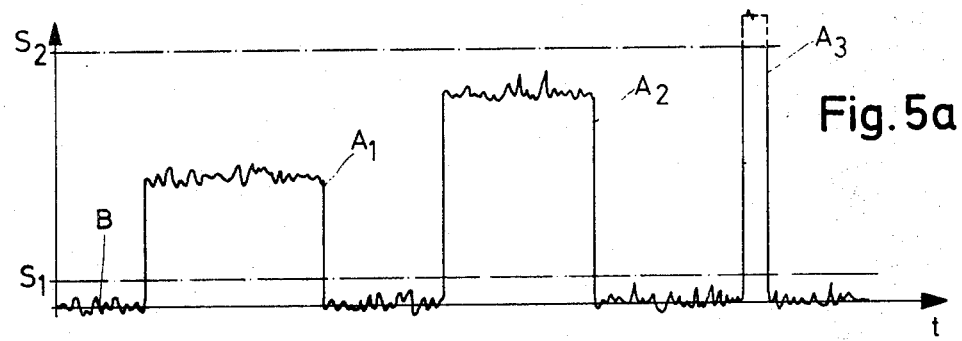
FIGS. 5a, 5b, and 5c are a series of curves illustrating time variations of electrical signals corresponding to various conditions in the actuating apparatuses illustrated in FIGS. 2, 3, and 4.

A signal-forwarding threshold circuit or limiter or clipping circuit 13 transmits that part of the output signal of the amplifier 12 which lies above a value corresponding to an acceleration that can be safely absorbed, and applies it to an integrator 14. In effect, the limiter 13 forms an integrand threshold $S_1$ as shown in FIG. 5a. There the wave form represents the output of the amplifier 12. The limiter 13 transmits only the portion of the wave form that exceeds the integrand threshold $S_1$. The clipping circuit 13 may be an operational amplifier with a certain bias voltage as shown for example in Steinbuch, Taschenbuch der Nachrichtentechnik, Springer-Verlag, Berlin 1967, S. 1152, FIG. 10.3/57. The time constant of the limiter 13 is set at a multiple of the mean response time of the safety device SD and the integrand threshold $S_1$ is set at an empirically defined value between 2g and 10g, so that shocks with a short duration occurring during the normal operation of the automobile don't generate an output signal at limiter 13.

Limiter 13 also clips or cancels that part of the wave form from the amplifier 12 which lies above a threshold $S_2$, (shown in FIG. 5a), which is substantially above the threshold $S_1$. This limiting action makes sure that the air cushion in the safety device SD is not actuated in response to very high but brief accelerations such as in the order of 40g which can occur when broken stones strike the sensor directly. Limiters which perform such clipping at two reference levels are often referred to as slicers or doubleended clippers or limiters.

After the integrator 14 has integrated the output of the limiter 13 a second threshold value switch or limiter 15 transmits the output of the integrator 14 as soon as that output attains an amount corresponding to a critical speed $V_k$. Thus the limiter or clipper 15 clips off the bottom portion of the output of the integrator 14 below the critical speed $V_k$. An output stage or amplifier 16 responds to the signal from the limiter 15 by applying a pulse to an ignition element 17 in the safety device SD. The ignition element 17 detonates the powder charge (not shown) which inflates the air cushion or air bag 3.

The value of the critical speed at which the output stage 16 is set, according to one embodiment of the invention, is 3 to 6 meters per second.

Figure 3:
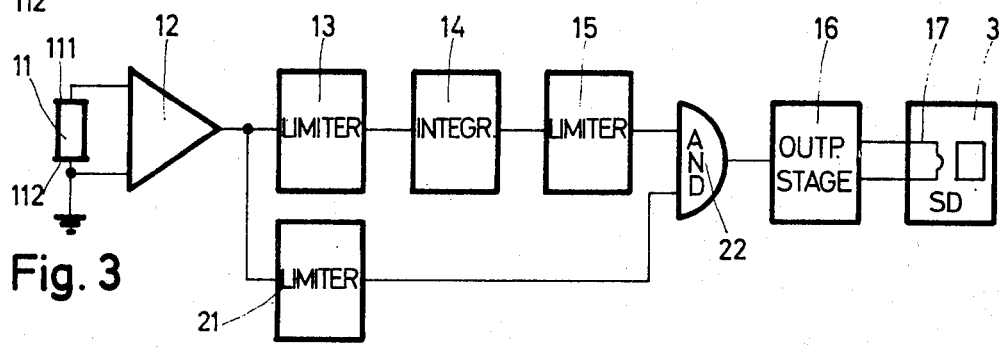
FIG. 3 is a block diagram of another actuating apparatus embodying features of the invention for use in the car of FIG. 1.

Another embodiment of the invention is illustrated in FIG. 3. Here the output signal of the amplifier 12 is applied to another threshold value switch 21. The output of the limiter 21 is in turn connected to the input of an AND gate 22. The latter intervenes between the limiter 15 and the output stage 16. Thus the AND gate 22 receives its second input from the limiter 15 and applies its output to the stage 16. In FIG. 3 the limiters 13 and 15 combine with the integrator 14 to produce a signal which corresponds to a critical speed value $V_k$ as described with respect to FIG. 2. The threshold value switch 21 operates the AND gate so that the output of the limiter 15 is applied to the output stage 16 only when the critical speed value $V_k$ occurs during an acceleration sensed at the amplifier 12. This positively eliminates the effects of brief acceleration or deceleration shocks.

Figure 4:
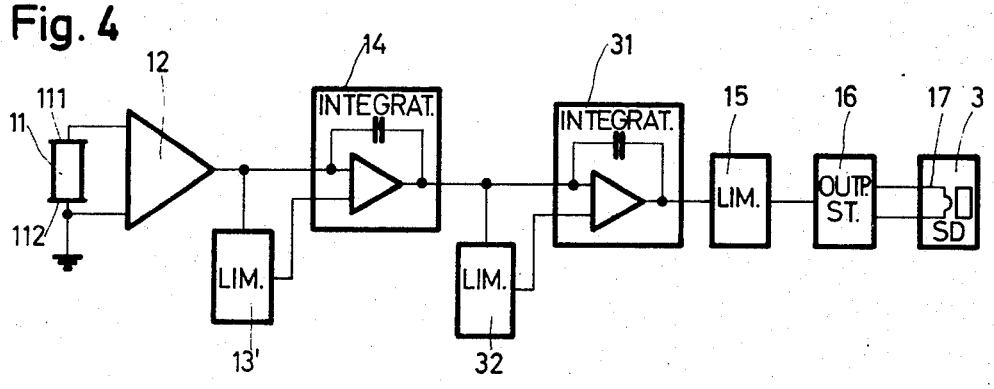
FIG. 4 is a block diagram of still another actuating apparatus embodying features of the invention and suitable for use in the automobile of FIG. 1.

In FIG. 4 double integration is used. Thus a signal corresponding to a distance serves as a release criterion. That is to say, the signal corresponding to acceleration or deceleration is integrated twice. This produces a signal corresponding to a distance. In FIG. 4 the output signal of the amplifier 12 is applied to both the integrator 14 and a threshold value switch or limiter 13' whose threshold is identical with the integrand threshold $S_1$. According to the embodiment of the invention in FIG. 4, the integrator 14 is a capacitive, variable-gain feedback amplifier or operational integrator. The limiter allows the integrator 14 to integrate those output signals of the amplifier 12 which exceed the integrand threshold $S_1$. A signal corresponding to a speed appears at the output of the integrator 14. This signal is applied to an integrator 31 identical with the integrator 14 and to a second threshold value switch or limiter 32. The integrator 31 integrates those portions of the output of the integrator 14 which exceed a threshold determined by the limiter 32. Thus the output of the integrator 31 corresponds dimensionally to a distance.

As soon as the output signal of the integrator 31 exceeds the threshold value of the limiter 15, the output stage 16 produces a pulse to actuate the ignition element 17 in the safety device SD and thereby blow up the air bag 3.

Figure 5B:
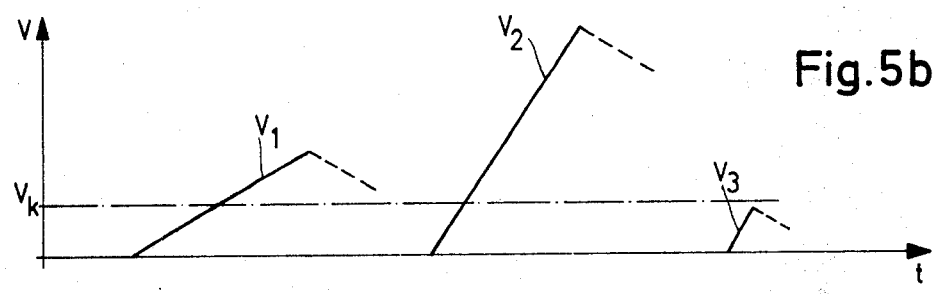
Figure 5C:
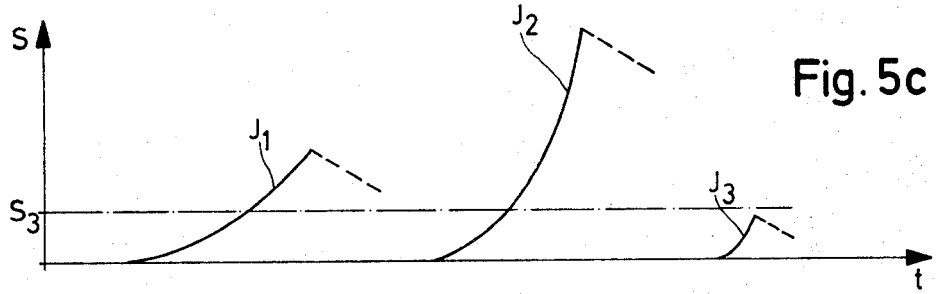

The operation of the above described actuator may be best understood by referring to FIGS. 5a to 5c, which are not necessarily true to scale. In FIG. 5a the waveform represents the output of the amplifier 12 and corresponds to the acceleration and deceleration of the car 1 plotted against the time t. The waveform is composed of signals $A_1$, $A_2$, and $A_3$ which represent major accelerations. Minor vibrations are designated B. The integrand threshold $S_1$ appears in broken lines parallel to the time axis. This integrand threshold is determined by the limiter 13 which transmits only those portions of the waveform above the threshold value $S_1$. Below the threshold $S_1$, accelerations of the car 1 are not integrated. Thus, the vibrations of the curve B below the threshold value have substantially no effect upon the integrator 14.

The waveform in FIG. 5b represents the output of the integrator 14. The integrated signals $V_1$, $V_2$ and $V_3$ are associated with the signals $A_1$, $A_2$ and $A_3$. The signal $V_2$ attains a value corresponding to the critical speed $V_k$ established by the limiter 15 much sooner than the signal $V_1$. Thus the air cushion is released sooner for the signal $V_2$. The output signal $A_3$ characterizes a high but brief acceleration. It is limited by the upper limiting value $S_2$ in the limiter 13. Signal $V_3$ at the output of the integrator 14 which corresponds to the signal $A_3$ at the output of amplifier 12 never attains a value corresponding to the critical speed $V_k$.

FIG. 5c illustrates the waveform appearing at the output of the integrator 31. This waveform includes three output signals $J_1$, $J_2$, and $J_3$ which are generated as a result of the output signals $A_1$, $A_2$, and $A_3$ of the amplifier 12 because of the double integration occurring in FIG. 4. In this case, the air cushion 3 of the safety device 2 is actuated only after the waveform at the output of integrator 31 exceeds a threshold $S_3$ corresponding to a distance and determined by the limiter 15.

Figure 6:
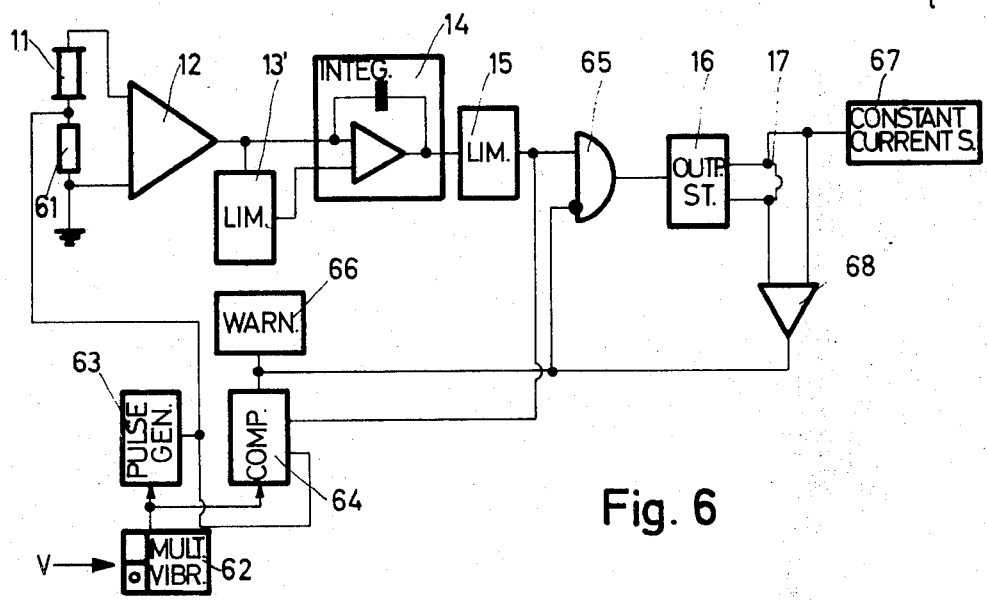
FIG. 6 is a block diagram of a test circuit for testing the embodiment of the actuating apparatus illustrated in FIG. 2.

FIG. 6 illustrates a block diagram of one embodiment of an actuator which includes an internal test circuit. Basically the actuator of FIG. 6 corresponds to that of FIG. 4, but does not include the second integration and limiting performed by the integrator 31 and limiter 32. Thus, the output at the limiter 15 corresponds to the output of the limiter 15 in both FIGS. 2 and 3.

In FIG. 6 a resistance 61 in series with the piezoelectric acceleration sensor 11 exhibits a resistance which is much smaller than the input resistance of the amplifier 12. When the battery voltage V of the car is started, it turns on a monostable multivibrator 62. The latter turns on a pulse generator 63 and a comparator 64 with two inputs for a short time, approximately 100 msec. One of the inputs of comparator 64 is connected to the output of the pulse generator, the other to the output of limiter 15. The comparator not described in detail may for example be of the type shown in the Deutsche Offenlegungsschrift 1.512.511. During testtime the electrical connection between the actuator and the ignition element 17 of the safety device SD is interrupted. For that purpose for example the monostable multivibrator 62 delivers an L-signal to an inverting input of an AND gate 65 (electrical connection to the multivibrator not shown), whose other input is connected to the output of limiter 15. The operation of the test circuit is as follows:

The pulse generator 63 emits two pulses in succession. These pass over resistance 61 to the input of the amplifier 12 and simultaneously to the first input of comparator 64. The first pulse is sufficient so that the output of the amplifier 12 exceeds the integrand threshold $S_1$ of the integrator 14. However, the pulse is such that, after integration by the integrator 14, the output of the integrator does not exceed a value corresponding to the critical speed $V_k$ which represents the threshold value of the limiter 15. Thus, if the operation of the actuator is correct, no signal appears at the output of the clipper 15 and hence at the second input of comparator 64.

The second pulse from the pulse generator 63 is such that it allows the integrator 14 to attain an output value greater than the critical speed $V_k$. Thus, a signal now appears at the output of the clipping circuit 15 and hence at the second input of comparator 64.

If the comparator determines that no pulse appears at the output of the limiter 15 after the first pulse from the pulse generator 63, while an output signal appears after the second pulse from the pulse generator 63, the operation of the actuator is correct and no signal will appear at the output of the comparator connected to an indicator 66 and to the inverting input of AND gate 65. Thus, after testtime, the electrical connection between the clipping circuit 15 and the output stage 16, and hence between the actuator and the ignition element 17 is reestablished. However, if the actuator is found to be defective, that means for example that a pulse appears at the output of the limiter 15 after the first pulse from the pulse generator 63, the comparator furnishes an output signal to the indicator 66 which is operated to warn the driver. Simultaneously the output signal of the comparator 64 is fed to the inverting input of the AND gate 65, so that now the electrical isolation between actuator and ignition element 17 is not cancelled.

To provide continuous testing of the operability of the ignition element a constant current source 67 provides a small continuous current flow through the ignition element 17. The current and the voltage drop across the ignition is compared with the voltage of the constant current source 67 in a comparison circuit 68, consisting for example of a differential amplifier, whose output is connected to a bipolar limiter. If the voltage drop across the ignition element is not normal, i.e. the ignition element is defective, the comparison circuit 68 furnishes an output signal to the inverting input of the AND gate 65 and to the indicator 66. Thus, as described below, the electrical connection between the actuator and the ignition element 17 is interrupted and the driver of the automobile is warned by operating the indicator. In this way the ignition element 17 is constantly tested during operation of the car.

What is claimed is:

1. An apparatus for actuating a safety device to protect passengers of a vehicle, comprising sensor means mounted in the vehicle for producing a signal corresponding to the acceleration of the vehicle, limiter means coupled to said sensor means for clipping off a portion of the signal below a value corresponding to the normal accelerations of the vehicle, integrating means coupled to said limiter means for integrating the output of said limiter means, threshold responsive means coupled to said integrating means for producing an indication when the output of said integrating means exceeds a given level so as to actuate the safety device, pulse generator means coupled to said limiter means for producing two successive pulses and applying them to said limiter means, both of said pulses being greater than the value, the first of said pulses being sufficient to produce an output from said integrating means less than the given level and the second greater than the given level, comparator means coupled to and responsive to the output of said threshold responsive means and said pulse generator means, coincidence gate means coupled to and responsive to the output of said comparator means and to the output of said threshold responsive means, said coincidence gate means being substantially disabled by an output of said comparator means, said comparator means producing a signal at said coincidence gate means only if a single signal appears at the output of said threshold responsive means, and an alarm indicator coupled to and responsive to said comparator means for producing a signal in response to an output from said comparator means.

2. An apparatus as in claim 1, wherein said sensor means includes a piezoelectric acceleration detector and a series connected amplifier.

3. An apparatus as in claim 2, wherein said sensor means includes a resistor in series with said piezoelectric detector, said pulse generator means applying the pulse between said resistor and said detector.

4. An apparatus as in claim 1 wherein said sensor means includes a piezoelectric acceleration detector and a series connected amplifier, and wherein said limiter means further clips off a portion of the signal from said sensor means which exceeds a second value, so that said limiter means transmits only the portion of the signal from the sensor means between the two values.

5. An apparatus as in claim 1, wherein said integrating means has a discharge time constant of between 5 and 500 ms.

6. An apparatus for actuating a safety device to protect passengers of a vehicle, comprising sensor means mounted in the vehicle for producing a signal corresponding to the acceleration of the vehicle, limiter means coupled to said sensor means for clipping off a portion of the signal below a value corresponding to the normal accelerations of the vehicle, integrating means coupled to said limiter means for integrating the output of said limiter means, threshold responsive means coupled to said integrating means for producing an indication when the output of said integrating means exceeds a given value so as to actuate the safety device, and, pulse generator means for producing two successive pulses and applying them to said limiter means, both of said pulses being greater than the value corresponding to the normal accelerations of the vehicle, only the second of said pulses being sufficient to produce an output from said threshold responsive means, comparator means coupled to the output of said threshold responsive means and said pulse genreator, coincidence gate means coupled to and responsive to the output of said comparator means and to the output of said threshold responsive means, said coincidence gate means being substantially disabled by an output of said comparator means, said comparator producing a signal at said coincidence gate means only if a single signal appears at the output of said threshold responsive means, and an alarm indicator responsive to said comparator for producing a signal in response to an output from said comparator means, ignition means coupled to the output of said coincidence gate means for exciting the safety device, constant current source means connected to said ignition means, comparison means coupled to the output of said ignition means and said constant current source means for comparing the voltage drop across said ignition means with the output of said constant current source means and producing a signal when the comparison between the two departs from a predetermined condition.

7. An apparatus for actuating a safety device to protect passengers of a vehicle, comprising sensor means mounted in the vehicle for producing a signal corresponding to the acceleration of the vehicle, limiter means coupled to said sensor means for clipping off a portion of the signal below a value corresponding to the normal acceleration of the vehicle, integrating means coupled to said limiter means for integrating the output of said limiter means, threshold responsive means coupled to said integrating means for producing an indication when the output of said integrating means exceeds a given value so as to actuate the safety device, ignition means coupled to said threshold means for exciting the safety device in response to a signal from said threshold responsive means, constant current source means connected to said ignition means, comparison means coupled to the output of said ignition means and said constant current source means for comparing the voltage drop across said ignition means with the output of said constant current source means and producing a signal when the comparison between the two departs from a predetermined condition, said sensor means includes a piezoelectric acceleration detector and a series connected amplifier.

* * * * *